INVENTOR.
JOHN J. MACKIN

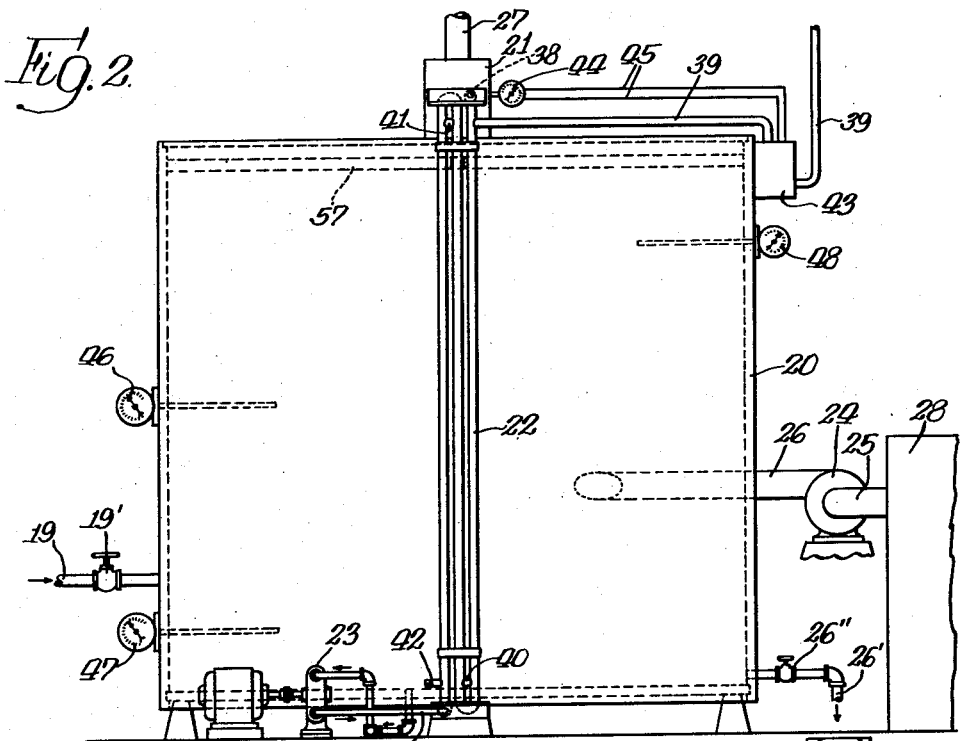
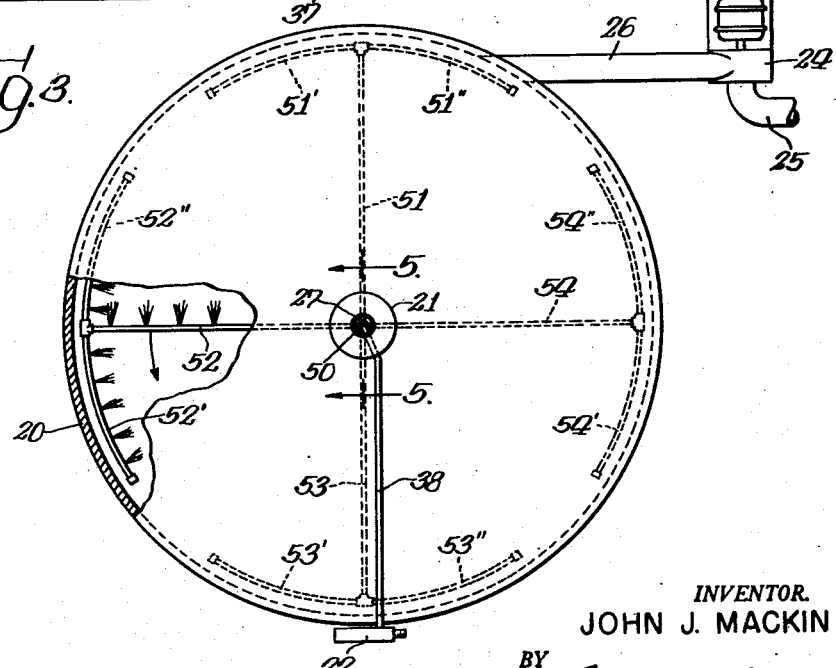

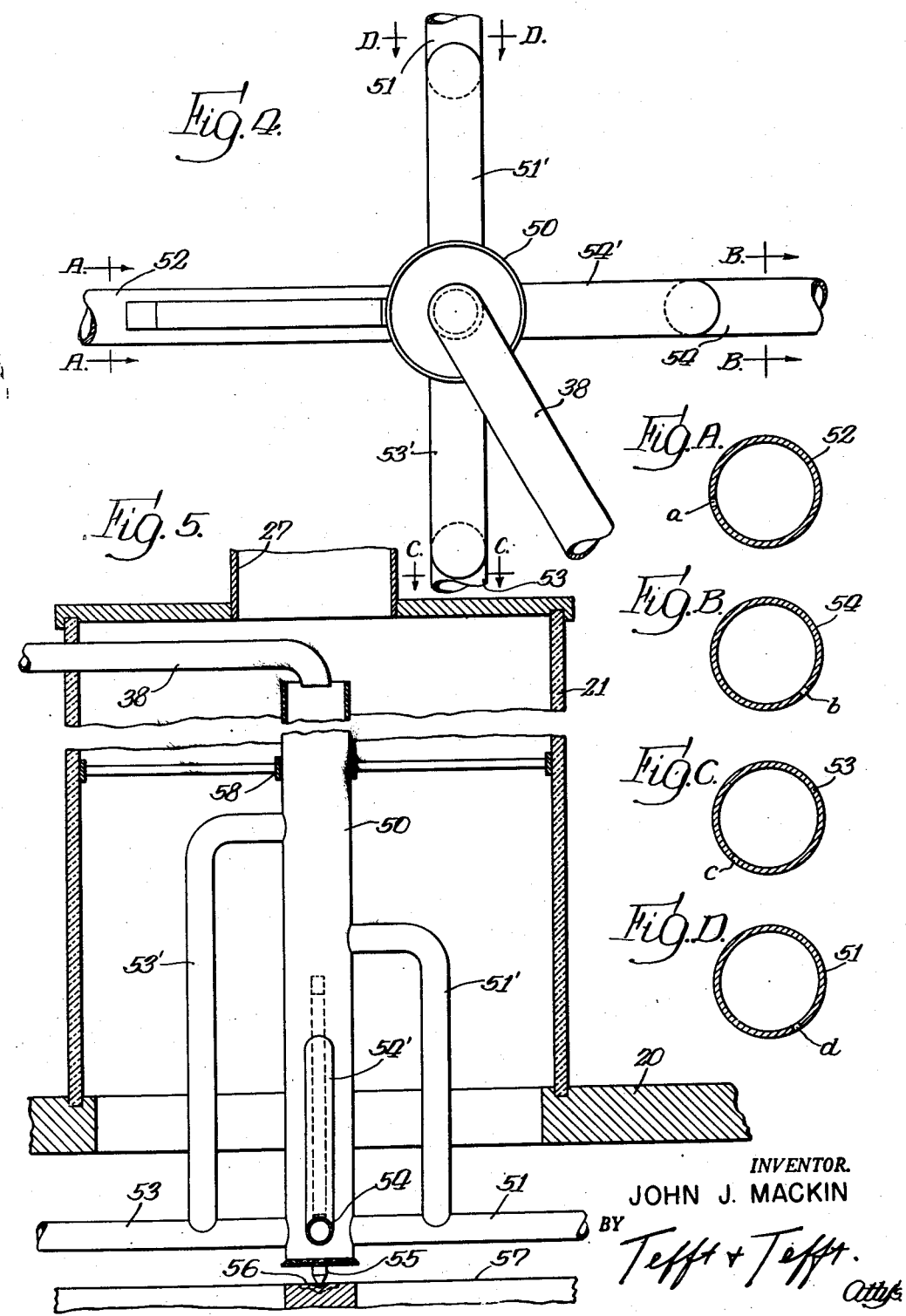

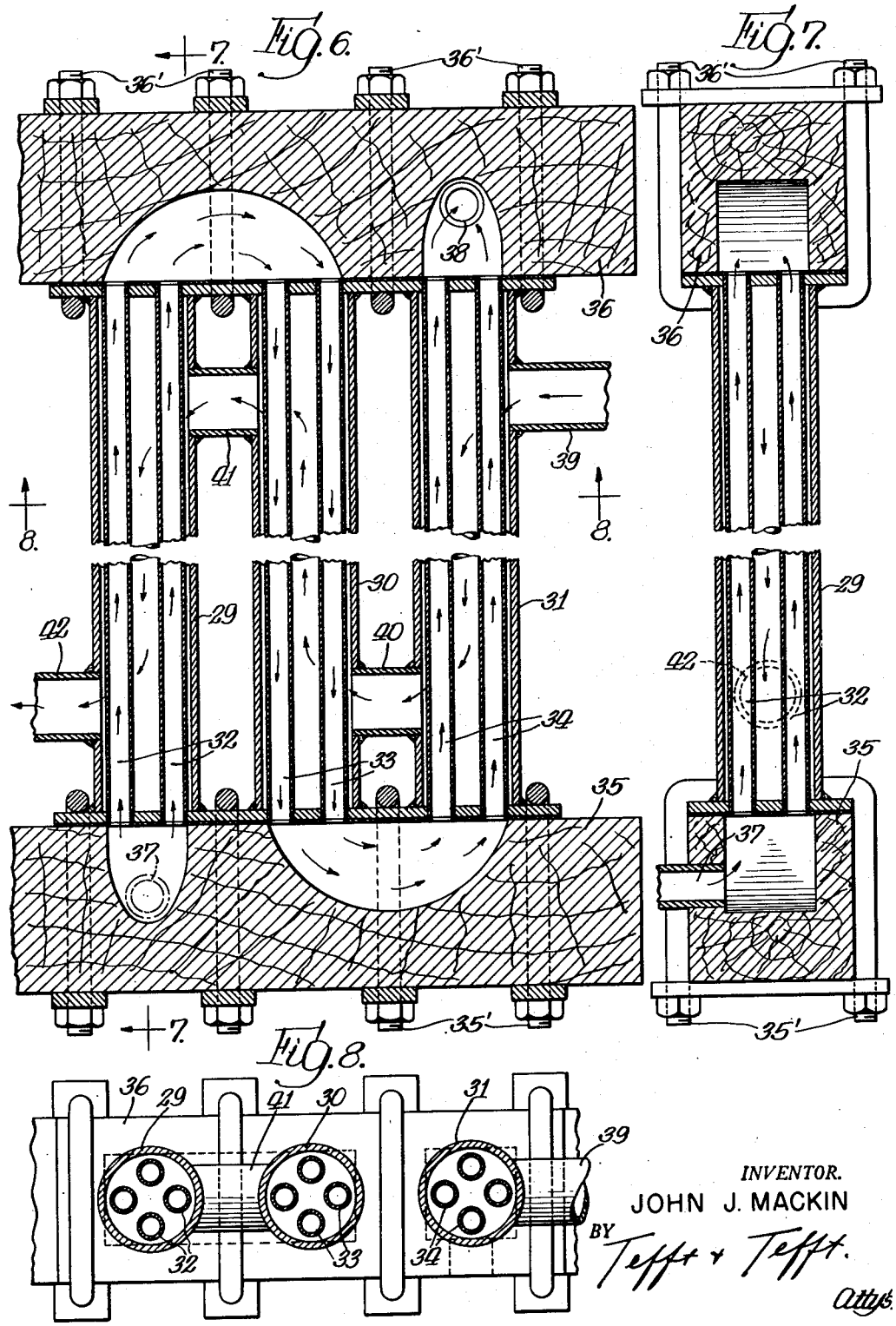

July 15, 1947. J. J. MACKIN 2,423,897
PROCESS FOR PRODUCING VINEGAR
Filed July 9, 1943 5 Sheets-Sheet 5

INVENTOR.
JOHN J. MACKIN
BY Tefft + Tefft.
attys.

Patented July 15, 1947

2,423,897

UNITED STATES PATENT OFFICE 2,423,897

PROCESS FOR PRODUCING VINEGAR

John J. Mackin, Green Bay, Wis., assignor to Leslie J. Kelly, Green Bay, Wis.

Application July 9, 1943, Serial No. 493,998

13 Claims. (Cl. 99—147)

This invention relates to an miprovement in the process and equipment for producing vinegar. Although the invention may have broader application, it will be described as applied to making commercial vinegar from alcohol.

By this process, alcohol is oxidized to produce acetic acid as expressed by the formula $C_2H_5OH$ (alcohol) plus $O_2$ (oxygen) equals $CH_3COOH$ (acetic acid) plus $H_2O$ (water).

By the exposure, under suitable conditions, of alcohol to the action of the atmospheric oxygen, one-third of the entire quantity of hydrogen contained in it is withdrawn, and aldehyde is formed. The latter, however, immediately combines further with oxygen, and is converted into acetic acid; the formation of vinegar from alcohol being, therefore, a partial process of combustion.

Aside from the pure chemistry of the process as above expressed, the formation of vinegar can only be effected in the presence of certain organisms or bacteria plants of low order, called *Mycoderma aceti*, or vinegar bacteria. It may therefore be said that the entire art of the manufacture of vinegar depends on an accurate knowledge of the conditions of life of the vinegar bacteria, and in maintaining these conditions of life. For converting in the shortest time, the largest quantity of alcohol into acetic acid, the conditions most favorable for the development of vinegar bacteria must be maintained, and these conditions briefly are as follows:

1. The basic material must be a nutrient fluid, which, besides alcohol and water, contains nitrogenous matter and alkaline salts. The quantities of these bodies must be maintained within certain limits.

2. The fluid must be in immediate contact with oxygen (atmospheric air).

3. The temperature of the fluid and the air surrounding it must be maintained within certain limits.

Heretofore, the method and apparatus for producing vinegar has involved the use of wood chips, shavings or charcoal in the vinegar generator, which frequently required recharging, and as the vinegar ferment is very sensitive to changes, wide variations in the quality and production of alcohol resulted.

It is the particular object of this invention to provide method and apparatus to produce vinegar which does not involve the use of shavings or the like, and in which conditions for maximum production of high grade vinegar can be accurately and continuously maintained.

Other objects and benefits will be disclosed in the following descriptions and drawings in which:

Fig. 2 is a side elevation view of the vinegar generator;

Fig. 3 is a broken top elevation view of the generator shown in Fig. 2;

Fig. 4 is an enlarged broken top elevation view of sparger apparatus, as will later be explained;

Fig. 5 is a broken side cross sectional view of the top of the sparger apparatus shown in Fig. 4 taken on the line 5—5 of Fig. 3;

Figs. A, B, C and D are enlarged cross sectional views of the sparger arms shown in Fig. 4 as they would appear on the cross sections A—A, B—B, C—C and D—D respectively.

Fig. 6 is an enlarged broken cross sectional side elevation view of the cooler apparatus used on the generator as will later be explained.

Figure 9:
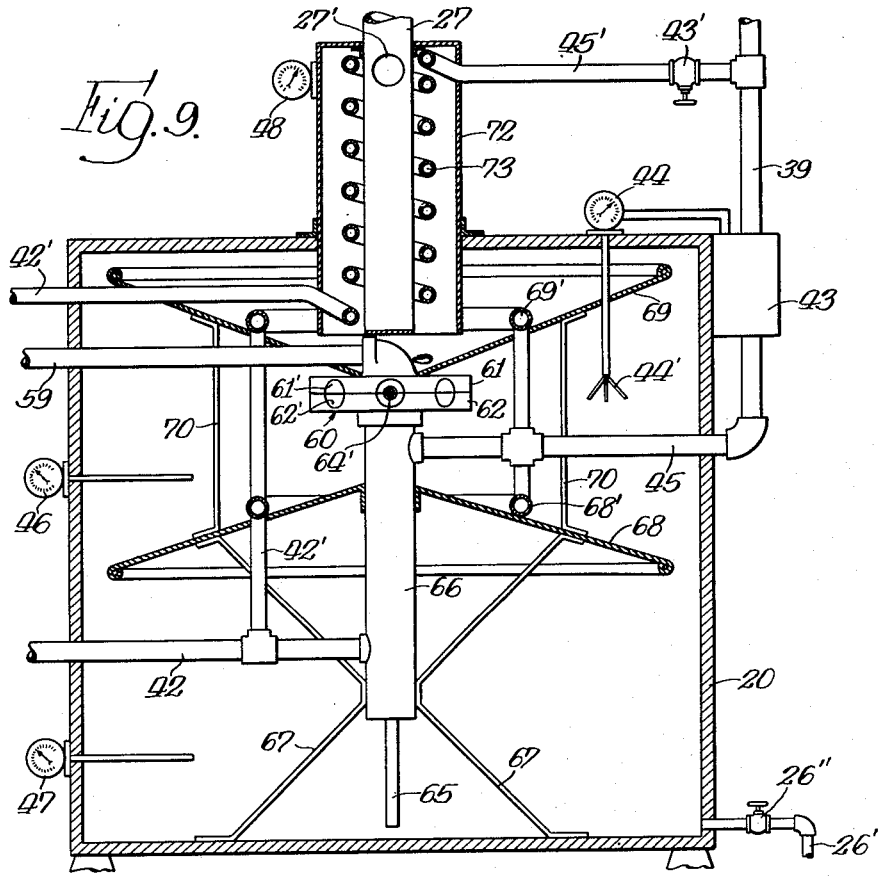
Figure 10:
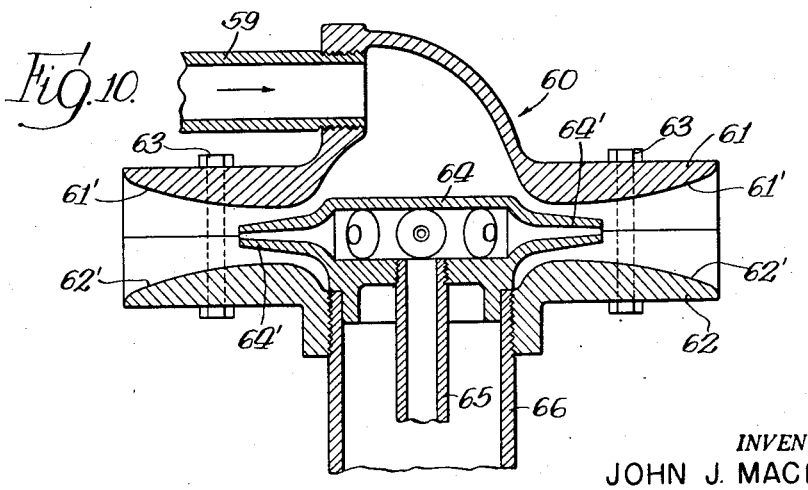

Fig. 7 is a cross sectional side elevation view of the apparatus shown in Fig. 6;

Fig. 8 is a bottom plan sectional view of the cooler apparatus as it would appear on the section lines 8—8 of Fig. 6;

Fig. 9 is a cross sectional elevation view of an optional form of generator; and Fig. 10 is a cross sectional view of a spray head used in the optional form of generator.

Figure 1:
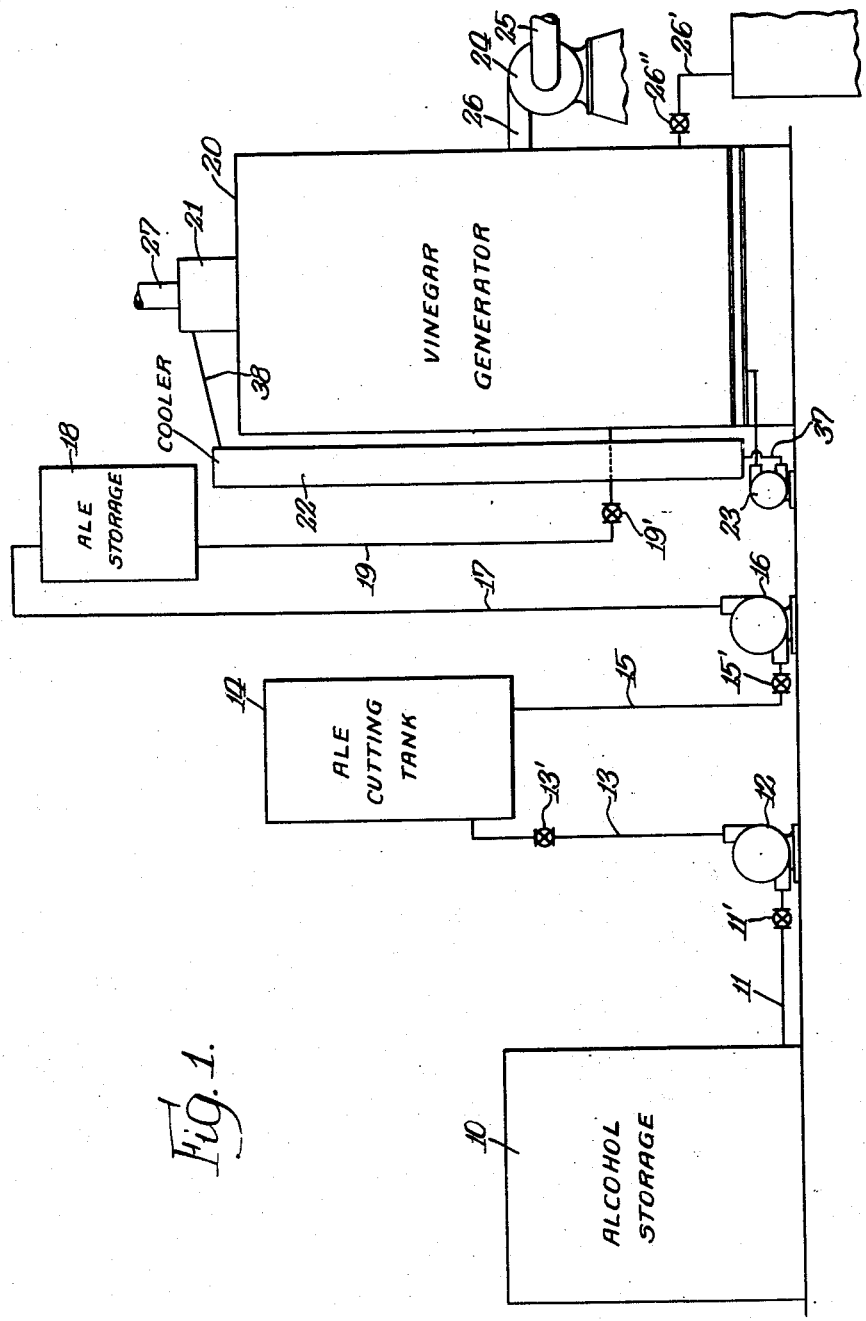
Fig. 1 is a diagrammatic layout of my improved apparatus.

Now referring to Fig. 1, I show diagrammatically the vinegar producing equipment. An alcohol storage tank 10 is located at any convenient point in the plant, and is connected to an ale cutting tank 14 by a conventional piping and pump system including the pipe 11, valve 11', pump 12, pipe line 13 and valve 13'. The alcohol in the ale cutting tank is cut down to 10 or 11% by volume by the addition of pure water containing a limited quantity of alkaline salts. The ale in this tank is permitted to thoroughly mix and attain room temperature, and from there it is delivered to an ale storage tank 18 by the pump 16, through the pipe lines 15 and 17, controlled by the valve 15'.

At this point, in order to provide the proper nutrient fluid, there is added and thoroughly mixed, pure cultures of bacteria to form the vinegar ferment. This may be accomplishd by adding wine, beer or any fruit wine, such as apple or pear cider.

The nutrient fluid is held in the ale storage tank until it attains room temperature, and at the proper cycle, as will later be explained, is delivered to the vinegar generator by the pipe line 19 controlled by the valve 19'. The vinegar generator 20 has a glass doored cupola 21 and a stack 27 as will later be explained.

Air to the generator is supplied, at this embodiment of the invention, by a blower 24, through an inlet pipe 25, discharging into the generator by the pipe 26. In order to control the temperature within the generator, a cooler 22 is provided, and this cooler is controlled by water circulating therethrough, while the nutrient fluid is circulated through the generator and cooler by means of the pump 23. The finished vinegar is drawn off through a pipe line 26' controlled by a valve 26'' as shown.

Now referring to Figs. 2 and 3, I show enlarged views of the generator which will now be explained in detail. The generator casing 20 is preferably made of wood staves in order to guard against radical changes in temperature. Larch is the preferred type of wood for the construction of generators, but owing to its high cost, they are usually constructed of pitch pine which effectively protects fermentation in the generator and resists the action of the alcohol. As before stated, nutrient fluid is delivered to the bottom of the generator by the pipe 19. Preferably, in order to promote fermentation, a quantity of about 20 to 25% of finished vinegar is left in the bottom of the tank. The fluid is now pumped from the bottom of the tank through the pipe line 37 and through the cooler 22. It is delivered to a sparger spray ring device as shown in Figs. 4 and 5, the same being composed of a central tubular member 50 and radial arms 51, 53, and 54.

The arms are supported by support pipes 51', 52', 53' and 54' respectively. At the end of each of the arms is an arcuate spray member as 51' and 51'' for the arm 51, 52' and 52'' for the arm 52, 53' and 53'' for the arm 53 and 54' and 54'' for the arm 54. The entire spray device is supported by cross member 57, which carries a needle bearing 56 in which is inserted the pointed needle 55 as clearly shown in Fig. 5, the upper end of the tube 50 being supported by a ring bearing 58 as shown.

Now referring to the cross sections, Figs. A to D inclusive, it will be observed that nozzle openings, a, b, c and d are perforated therein at various points in the arms, these openings being proportioned and arranged to effectively spray the fluid over the entire cross section of the generator and at the same time arranged by the reactive force of the jets to rotate the sparger device on the pin bearing 55—56. It will be appreciated that by this arrangement, the entire cross section of the generator is filled with a fine drop rain, which effectively exposes to air a large area of the nutrient fluid. At the same time, air is being delivered by the fan 24, through the pipe line 26, entering the generator tangentially, as shown in Fig. 3. This creates a whirling vortex of air throughout the generator, which creates intimate turbulent contact with the nutrient fluid to rapidly and effectively oxidize the alcohol in the fluid to create aldehyde and acetic acid.

Now in order to provide the optimum conditions for the action of the bacteria, the temperature must be controlled between 68° and 95° F. and the air must be maintained as free as possible from other bacteria to prevent contamination. There is therefore provided a filter and temperature conditioning device 28 through which the air passes before entering the fan 24 from the inlet pipe 25. It will be appreciated that upon the oxidation of the alcohol, considerable heat is created and this heat must be dissipated in order to maintain the optimum temperature conditions for the vinegar ferment.

This temperature control is provided by cooling water, which, for economical reasons, is recirculated from a cooling tower by the pipe line 39 passing through an electric control device 43 and thence into the cooler by the pipe line 39.

Now referring to Figs. 6, 7 and 8, it will be observed that the cooling water is circulated around a series of tubes 32, 33 and 34 by means of jacket members 29, 30 and 31, and connector members 40, 41 and 42. This is a conventional form of cooling system, as will be well understood in the art, and it will be appreciated that the water is thoroughly circulated around the tubes in order to cool the nutrient fluid to dissipate the heat of oxidation, and to maintain optimum ferment conditions. The tubes are connected by header members 35 and 36 joined to the cooler jackets and flanges by clamp bolts 35' and 36' as shown. The nutrient fluid is delivered to the cooler through the pipe 37 and discharged at the opposite end by the pipe 38.

In order to maintain the necessary temperature control, temperature gauges having long tubes are inserted at various points in the generator as shown for the gauges 46, 47 and 48. In the top of the cooler, a master control gauge 44 is inserted close to the outlet pipe 38. This gauge naturally shows the temperature of the fluid just prior to being sprayed in the generator, and as this is the critical point, this gauge is made the master electric gauge which controls the flow of cooling water by means of a conventional flow meter device 43. The control meter is a conventional device, well known in the art, and will not be explained in further detail other than to note it is connected electrically by wires 45 with the temperature gauge 44.

Now referring to Figs. 9 and 10, there is shown an optional generator structure in which the air supplied to the nutrient fluid is high pressure air, say 20 to 30 pounds, which ejects the nutrient fluid within the generator in an atomizing action with the fluid, to provide the intimate contact of the air and fluid to oxidize the alcohol. The casing 20 and various other structures employing the same numerals as the structure heretofore described, are practically the same and will not again be described in detail.

The compressed air enters the generator by the pipe 59 and is connected with a spray head 60 as clearly shown in Fig. 10. The body of the spray head is composed of two castings, 61 and 62 joined by bolts 63 as shown. The nozzle member 64 is a multiple jet nozzle having conventional ejector forms of nozzles 64′. These nozzles are in injector relationship with the ejector structures 61′ and 62′ as clearly shown in the drawing. It will be appreciated that when the compressed air enters the nozzle, a vacuum is created around the nozzle 64′ and thereby liquid is drawn upward through the tube 65 which extends to the bottom of the generator 20. The liquid thus raised is ejected forcibly outward in intimate contact with the air whereby the liquid is broken up into a fine mist which floats outwardly in the generator. This liquid is retained by the angular baffle plates 68 and 69 which are supported with the casing 66 by support members 67 and 70. On the baffle plates 68 and 69 there is mounted cooler rings 68′ and 69′ attached to the water pipe 45 emerging from the automatic control 43 and fed by the pipe 39 as previously described for the structure shown in Fig. 2. The casing 66 tightly surrounds the pipe 65, and as the water flows through the casing 66, it is discharged by the discharge pipe 42. Similarly, the cooling water entering the coils 68' and 69' is discharged by the pipe 42' through the discharge pipe 42. All of this water is under control of the automatic control 43 as actuated by the automatic gauge 44, having a projecting sensitive element 44' in contact with the fluid as it is discharged into the generator. By this structure, it will be appreciated that the temperature of the nutrient fluid is maintained at the optimum temperature for vinegar ferments.

This condition may further be observed by the various temperature gauges 46, 47 and 48 as shown. It will be appreciated that the baffle plates 68 and 69 catch, and are thoroughly wetted by the nutrient fluid, and thereby the fluid is continuously exposed to the air supplied through the pipe 59 to maintain proper ferments and oxidation conditions. There being a large excess of air under pressure, care must be exercised that stack losses are prevented by condensing any of the liquid being carried along by the discharged air through the stack 27. This is accomplished by having a casing 72 around the stack 27, and in this casing, providing a water cooling coil 73 which is connected with the water line in the conventional manner by the pipe 45' under control of the valve 43' and the discharge line 42', which eventually is returned to the return pump with the liquid from the discharge pipe 42, and thence pumped in a conventional manner to a cooling tower as previously described.

It will be observed that the casing 72 is brought down below the top of the generator in close proximity to the baffle plate 69 and the cooling coil 69'. The air from the nozzles must naturally travel outwardly and escape around the edges of the baffle plate 69 from whence it must pass over the cooling coil 69' and thence upwardly around the coil 73 to be discharged through the stack 27 through the opening 27'. This structure effectively reduces stack losses by condensing the escaping fluid which is always under control of the operator through the valve 43'.

Although this optional structure utilizes compressed air as explained, it will be appreciated that the same principles apply to this structure as to the structure described in Fig. 2. The nutrient fluid is exposed under optimum temperature conditions to a large volume of air and is held in intimate contact with this air to facilitate the rapid oxidation of the alcohol and the fermentation thereof.

Having thus described the invention, I now claim as new:

1. In the process of making vinegar, those steps which comprise the turbulent circulation through a confined space of a volume of air substantially in excess of that required for oxidation, and substantially filling the cross section of said space with a finely divided mist of free drops of alcoholic nutrient solution containing vinegar bacteria, exposed substantially throughout said space to said air while falling free of support therethrough.

2. In the process of making vinegar, those steps which include spraying an alcoholic nutrient solution containing vinegar bacteria in a fine mist throughout the upper portion of a confined space, allowing the finely divided drops of nutrient solution to fall free toward the bottom of such space, collecting such drops near the bottom of such space, removing heat of oxidation from the nutrient solution collected and respraying such solution, and subjecting the finely divided drops of nutrient solution throughout the cross section of said space to a large volume flow of turbulent air.

3. The method of claim 2, in which the flow of turbulent air is upwardly through said space from a level adjacent the level of collection to a point adjacent the level at which the nutrient is sprayed, whereby the unsupported drops of nutrient are subjected to the turbulent air substantially throughout the cross section of said space and substantially throughout the entire distance of their travel from the level of spray to the level of collection.

4. The method defined in claim 2, in which the air flow is effected in the form of a whirling mass through said space.

5. The method defined in claim 2, in which the air flow includes air materially in excess of the air required for oxidation.

6. The method described in claim 2, in which the air flow is divided, a portion thereof being delivered under pressure to the point at which the nutrient solution is sprayed, and being employed in atomizing the nutrient solution in the spray thereof.

7. A process of making vinegar, which consists in storing near the bottom of a confined space a nutrient solution of dilute alcohol with vinegar bacteria, withdrawing solution from that in storage, removing sufficient heat of oxidation to maintain its temperature below 95° F., discharging the cooled nutrient solution into the confined space above the nutrient solution therein in the form of fine droplets distributed substantially throughout the cross sectional area of such space, such space being open for the gravity fall of such droplets to the nutrient stored, and inducing counter current circulation in an upward direction through said space in turbulent current of a large volume of air to which the droplets of nutrient solution freely falling through such space are exposed.

8. A process of making vinegar, which consists in storing alcoholic nutrient solution containing vinegar bacteria near the bottom of a closed space, cooling said solution in storage, circulating nutrient solution from storage to a point near the top of said space, spraying the nutrient solution near the top of said space to fall freely to the nutrient solution in storage in the form of fine droplets substantially filling the cross section of said space, and circulating upwardly through said space in counter current to the falling droplets of nutrient solution a large volume of rapidly moving air.

9. A process of acetification which includes the storage of an alcoholic nutrient solution containing acetifying bacteria, withdrawing solution from that in storage, atomizing the solution so withdrawn, exposing the atomized solution to a large volume of air in which the atomized solution is free and fully exposed, and recirculating the solution, cooling it before reatomizing it to remove heat of oxidation.

10. A process of acetification which includes the storage of a nutrient alcoholic solution containing acetifying bacteria, withdrawing solution from that in storage, atomizing the solution so withdrawn, exposing the atomized solution to a large volume of air in excess of that required chemically for oxidation and in which the atomized solution is free and fully exposed, returning the previously atomized solution to the solution in storage after said exposure to air and again withdrawing portions of such solution from storage, cooling the solution to remove the heat of oxidation and reatomizing and exposing to air in free space the portions of such solution so withdrawn.

11. The method set forth in claim 9 in which the air to which the atomized solution is exposed in free space is in rapid motion.

12. A process of making vinegar which consists in storing a nutrient solution of dilute alcohol wth vinegar bacteria, withdrawing solution from that in storage, subdividing the withdrawn solution into minute droplets, discharging the several droplets into a confined space, delivering such droplets through such space while free and exposed on all of their respective surfaces, and subjecting the exposed surfaces of such droplets to contact in said confined space with a large volume of turbulent oxygen-containing air.

13. The method set forth in claim 12 in which the air to which the free droplets of nutrient solution are exposed is in rapid motion during the period of exposure, the exposure being followed by the collection of the exposed droplets and their return to the stored solution and the subsequent withdrawal and cooling of portions of said solution for reatomization and reexposure in a repetion of the cycle of steps set forth, the cooling being conducted at a rate to remove heat of oxidation and maintain the solution below 95° F.

JOHN J. MACKIN.

REFERENCES CITED

The following references are of record in the file of this patent:

UNITED STATES PATENTS

| Number | Name | Date |
|---|---|---|
| 1,880,381 | Frings | Oct. 4, 1932 |
| 2,089,412 | Owens | Aug. 10, 1937 |
| 127,812 | Turner | June 11, 1872 |
| 313,431 | Kuhn | Mar. 3, 1885 |
| 217,521 | Felde | July 15, 1879 |
| 181,999 | Tait | Sept. 5, 1876 |
| 2,022,970 | Meynen | Dec. 3, 1935 |
| 1,272,276 | Klein | July 9, 1918 |
| 2,135,235 | Hurford et al. | Nov. 1, 1938 |

FOREIGN PATENTS

| Number | Country | Date |
|---|---|---|
| 12,884 | Great Britain | 1892 |
| 15,475 | Great Britain | 1893 |

OTHER REFERENCES

Prescott and Dunn, Industrial Microbiology, McGraw-Hill Book Co., Inc., New York and London, 1940, pages 236, 237.